United States Patent [19]

Ringer et al.

[11] Patent Number: 4,695,017
[45] Date of Patent: Sep. 22, 1987

[54] RAILROAD SWITCH SNOW DEFLECTING AIR NOZZLE APPARATUS

[75] Inventors: Thomas R. Ringer, Gloucester; Byrne E. Bramwell, Kars, both of Canada

[73] Assignee: Canadian Patents and Development Limited, Ottawa, Canada

[21] Appl. No.: 4,210

[22] Filed: Dec. 23, 1986

Related U.S. Application Data

[63] Continuation of Ser. No. 826,681, Feb. 6, 1986, abandoned, which is a continuation of Ser. No. 639,415, Aug. 10, 1984, abandoned.

[30] Foreign Application Priority Data

Aug. 19, 1983 [CA] Canada .................................. 435008

[51] Int. Cl.⁴ .............................................. E01B 7/00
[52] U.S. Cl. .................................... 246/428; 239/552; 239/568
[58] Field of Search ................ 246/428; 239/552, 568; 126/271.2 B

[56] References Cited

U.S. PATENT DOCUMENTS

| | | |
|---|---|---|
| 1,778,637 | 10/1930 | Hollinger .......................... 246/428 |
| 1,803,358 | 5/1931 | Schumann .......................... 246/428 |
| 2,898,062 | 8/1959 | Magnus ............................. 246/428 |
| 3,223,835 | 12/1965 | Cherry et al. ...................... 246/428 |
| 3,697,746 | 10/1972 | Patterson et al. .................... 246/428 |
| 3,972,497 | 8/1976 | Ringer ............................. 246/428 |
| 4,043,397 | 8/1977 | Glowienke ......................... 239/552 |
| 4,081,161 | 3/1978 | Upright ............................. 246/428 |

OTHER PUBLICATIONS

Railroad Track Switch Heaters, received 10/12/82, Spectrum Infrared, Inc.

*Primary Examiner*—Randolph A. Reese
*Attorney, Agent, or Firm*—R. William Wray & Associates

[57] ABSTRACT

A railroad switch, snow deflecting apparatus is described in which air is fed through conduits to primary nozzles for directing air along the rails and towards the switch points to a position adjacent the apex of the switch. Secondary nozzles are spaced from the primary nozzles and behind the switch points so as to direct air along and between movable rails of the railway switch, and in the same direction as air from the primary nozzles to maintain the railway switch operationally free of snow.

9 Claims, 4 Drawing Figures

RAILROAD SWITCH SNOW DEFLECTING AIR NOZZLE APPARATUS

This application is a continuation of U.S. patent application Ser. No. 06/826,681 filed Feb. 6, 1986, which is a continuation of U.S. patent application Ser. No. 06/639,415 filed Aug. 10, 1984, both of which are now abandoned.

BACKGROUND OF THE INVENTION

This invention relates to apparatus for deflecting snow from a railroad switch.

The successful operation of a railway switch is often impeded in certain climates due to the accumulation of snow in and around the switch. Attempts have previously been made to keep the accumulation of snow to a minimum between the switch point and the stationary stock rail by the use of compressed air. However such attempts have not been as successful as one would wish.

I have determined that the type of apparatus is particularly important as well as the location of air nozzles in relation to the parts of the railway switch.

SUMMARY OF THE INVENTION

According to the present invention there is provided a railroad switch, snow deflecting air nozzle apparatus, comprising: a first elongate conduit for transporting air under and transversely of stationary rails of the switch to a location ahead of switch points thereof, at least one primary nozzle extending from the first conduit and having an open nozzle end for directing air along the rails and towards the switch points to a position adjacent the apex of the switch, a second elongate conduit for transporting air under and transversely of the stationary rails to a location spaced from the said at least one primary nozzle and behind the switch points, at least one secondary nozzle extending from the secondary conduit and having an open nozzle end for directing air along and between movable rails of the railway switch, and in the same direction as air from the said at least one primary nozzle, and air supply means, having a snow protected air inlet, for supplying air to the first and second conduits for air to exit from the said at least one primary nozzle at a velocity in the range of the order of 50 mph to of the order of 100 mph and from the said at least one secondary nozzle at a velocity in the range of the order of 50 mph to of the order of 100 mph, whereby, in operation, the railroad switch is maintained operationally free of snow.

DETAILED DESCRIPTION OF THE INVENTION

Figure 1:
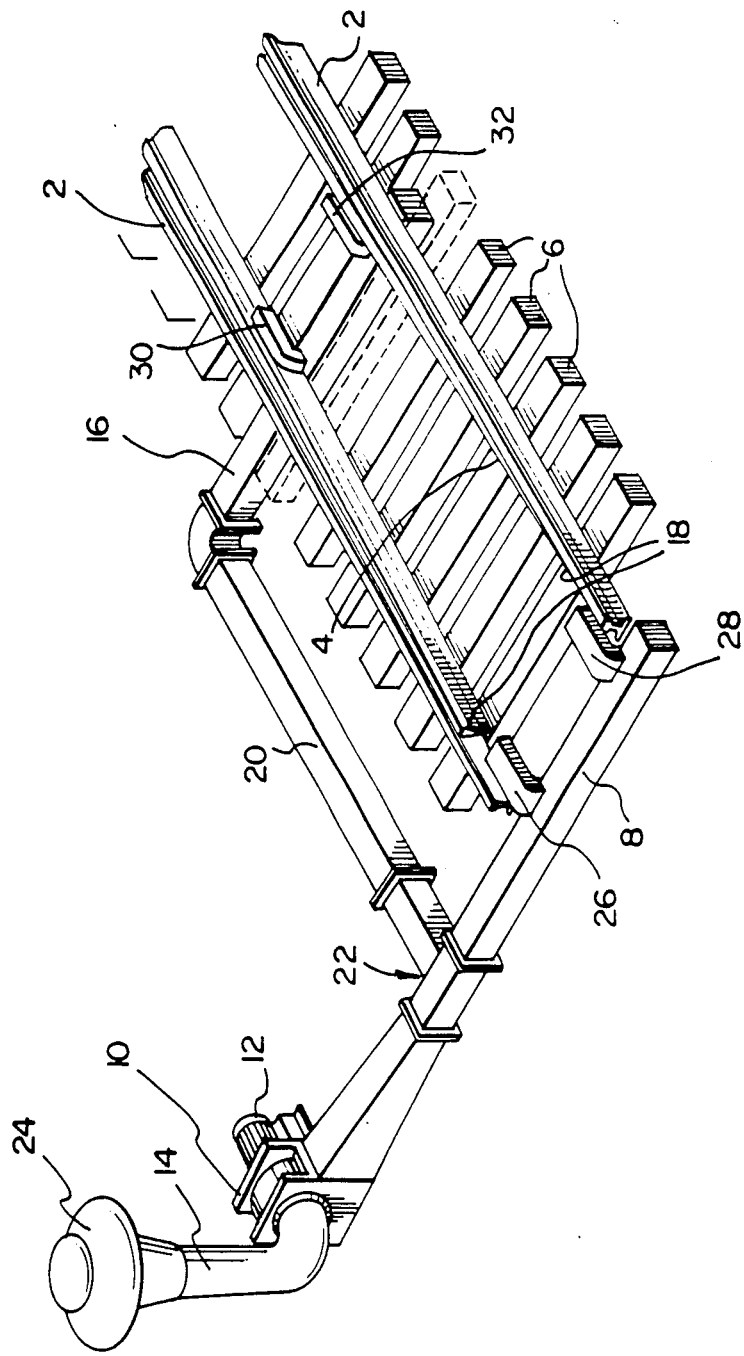
FIG. 1 is a diagrammatic representation of a two-stage railroad switch snow deflecting air nozzle apparatus according to one embodiment of the present invention.

In FIG. 1 part of a railway switch is illustrated, including stationary rails 2 and movable rails 4 resting on ties 6.

The railroad switch snow deflecting air nozzle apparatus includes a first elongate conduit 8 which extends under and transversely of the stationary rails 2 at a location which is ahead of the point end, or apex, of the railway switch. Air can be supplied through conduit 8 by a fan 10 driven by a motor 12 and receiving air through an air inlet pipe 14.

A second elongate conduit 16 is provided transversely of the stationary rails 2 at a location spaced from the first conduit 8 and behind the switch points 18 towards the heel end of the railway switch. The second elongate conduit 16 can receive air from fan 10 by way of conduit 20 which is connected at junction 22. Air can thus be supplied from the air supply means to both the first and second conduits. As will be seen in FIG. 1, the air supply inlet 14 is provided with snow protection in the form of a cowling 24.

Air can be supplied along and between the rails by way of two primary nozzles 26 and 28 as well as secondary nozzles 30 and 32. It will be observed that the nozzles are so located that air can be directed between the movable rails and also along the rails so as to maintain the railroad switch operationally free from snow. Advantageously, the fan 10 is designed to supply air to the first and second conduits for air to exit from the primary nozzles at a velocity in the range of the order of 50 mph to of the order of 100 mph and from the secondary nozzles at a velocity in the range of the order of 50 mph to of the order of 100 mph (160 kph). It will furthermore be understood that, in some cases, only one primary nozzle and one secondary nozzle may be required.

The first and second conduits may, conveniently, be located each between a pair of railway ties with the primary and secondary nozzles being supported, in part, by the ties with the nozzles located below the top level of the rails. The conduits under the ducting may be insulated from the rails to prevent signal trace current shorting.

It will be clear that the illustrated apparatus provides a horizontal air curtain, multi-stage point end nozzle system, utilizing an envelope of high velocity air, at ambient temperature, to prevent the accumulation of ice and snow. The air flow is delivered to the point end and throughout the length of the switch mechanism. A continuous high velocity stream of air is directed at the point of the rail, and throughout the length of the switch, thus preventing the entry of any falling or blowing snow, or rain into the switch. The induced secondary air flow is effective to produce vortexing action which cleans underneath the heads of the rail and between the ties. As will be appreciated, the area protected includes not only that between the stock rail and the point rail but also the slide plates on each tie between the opposing point rails. The primary nozzles blow air both into the opening between the stock rail and the point rail and also along the back of the point rail to clear the slide plates. The secondary nozzles blow across the slide plates and over the point rail to protect the critical areas of the switch. The nozzles are so positioned that the direction of air flow is from the apex or point of the switch to the heel end.

Figure 2:
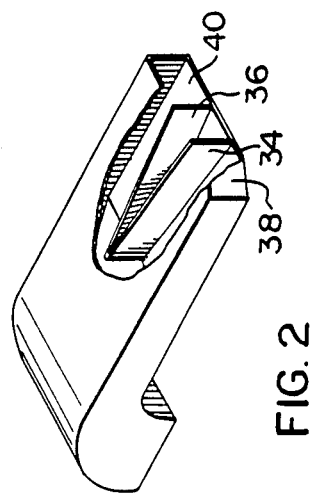
FIG. 2 is a diagrammatic representation of a bifurcated air nozzle.

The primary nozzles 26 and 28 may, if desired, be bifurcated. Such a construction is shown in FIG. 2 and it will be seen that plates 34 and 36 are effective to divide the air flow so as to provide two, divergent air flow outlets 38 and 40.

Figure 3:
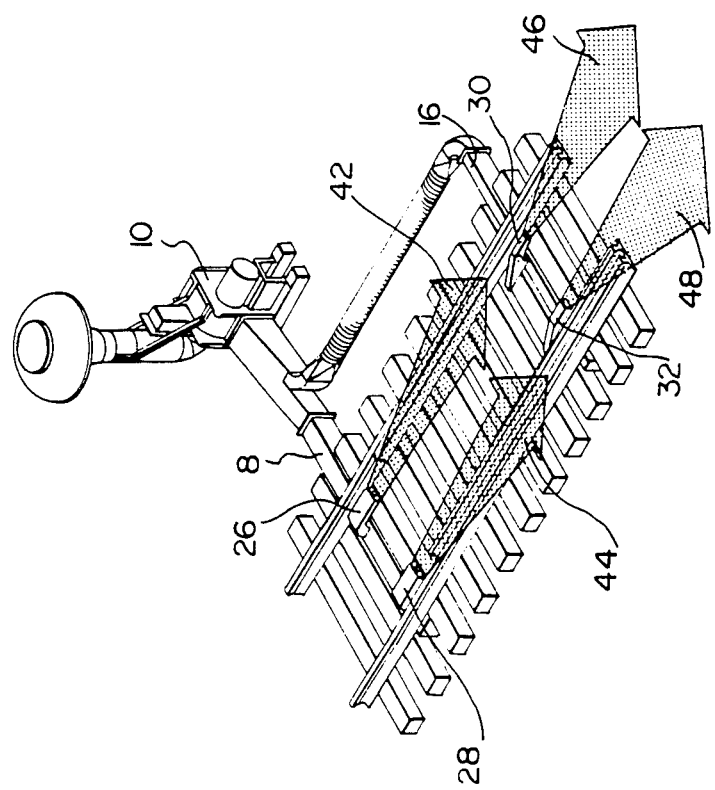
FIG. 3 is a diagrammatic representation to illustrate the air flow from the nozzles.

In FIG. 3 the air flow using bifurcated double outlet primary nozzles is illustrated. It will be observed that the secondary nozzles are single outlet and the air expanding from the nozzles passes over the slide plates on top of the ties and also over the top of the rails. The respective air flows are identified as 42, 44, 46 and 48.

Figure 4:
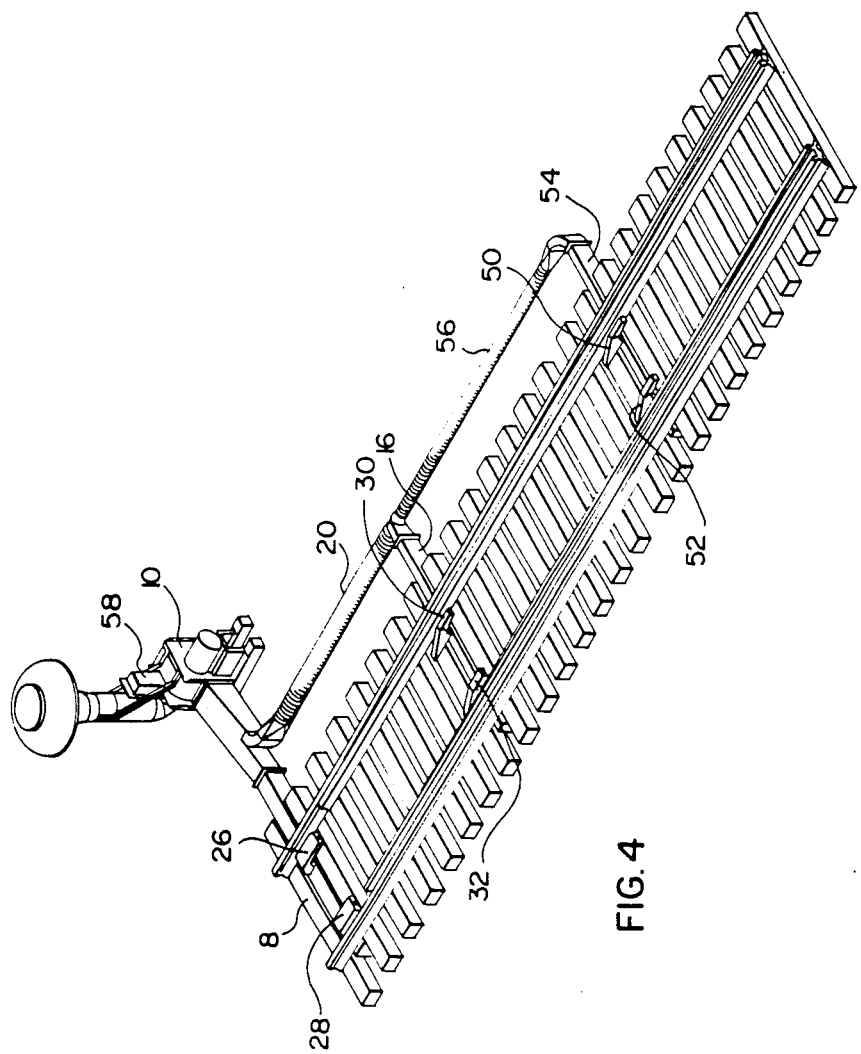
FIG. 4 is a diagrammatic representation of a three-stage railroad switch snow deflecting air nozzle apparatus.

The two-stage system illustrated in FIG. 1 is suitable for railway switches up to 22 feet in length, a number 12 turnout in the railway classification technology. The primary nozzles are ahead of the switch points with the air flow directed towards the heel end of the switch. The secondary nozzles are approximately halfway between the apex and the heel of the switch, i.e. downstream of the primary nozzles, with airflow directed to the heel of the switch. For a switch which is longer than 22 feet, for example number 16 or number 20 turnouts up to 39 feet, a three-stage system is desirable and such a system is illustrated in FIG. 4. Those parts in FIG. 4 which correspond to parts in FIG. 1 have been identified with the same reference numerals.

The secondary nozzles 30 and 32 in FIG. 4 would be at a location one-third the distance between the apex and the heel of the switch. Tertiary nozzles 50 and 52 are positioned at a location two-thirds the distance between the apex and the heel of the railway switch and are supplied with air by a further elongate conduit 54. Conduit 54 is connected by supply conduit 56 to conduit 20 as shown in FIG. 4.

It will be understood that in some cases the secondary nozzles and/or the tertiary nozzles may be bifurcated at the air outlet end to provide two divergent air outlets.

As is known, slide plates are usually provided on each railway tie under the point rails for the full length of each point rail of a railway switch. Air, in the described embodiments, exits from the nozzles, advantageously, just above the slide plates whereby they are maintained operationally free of snow and ice and a considerably lower air pressure may be utilized compared with earlier devices. Additional nozzles may, of course, be provided at each location and/or additional sets of nozzles along the length of the railway switch. The air from the nozzles attaches to a rail and travels along it in a COANDA effect. Velocity decay in the air flow from the primary nozzles is compensated along the length of the railway switch due to the air flow from the secondary nozzles.

The apparatus may be remotely controlled while an automatic control unit 58 (FIG. 4) may be provided including remotely located sensors to activate the apparatus at the onset of snow or freezing rain.

It will be readily apparent to a person skilled in the art that a number of variations and modifications can be made without departing from the true spirit of the invention which will now be pointed out in the appended claims.

I claim:

1. A railroad switch snow deflecting air nozzle apparatus, comprising:
   (a) a first elongate conduit for transporting air under and transversely of stationary rails of the switch to a location ahead of switch points thereof,
   (b) at least one primary nozzle extending from the first conduit and having an open nozzle end for directing air along the rails and towards the switch points to a position adjacent the apex of the switch and in a direction from the apex towards the heel of the switch,
   (c) a second elongate conduit for transporting air under and transversely of the stationary rails to a location spaced from the said at least one primary nozzle and behind the switch points,
   (d) at least one secondary nozzle extending from the secondary conduit and having an open nozzle end for directing air along and between movable rails of the railway switch, and in the same direction as air from the said at least one primary nozzle, each said secondary nozzle being about halfway between the apex and the heel of the switch to effectively act in series with a respective said primary nozzle,
   (e) air supply means, having a snow protected air inlet, for supplying air at ambient temperatures to the first and second conduits for air to exit from the said at least one primary nozzle at a velocity of the order of 100 mph and from the said at least one secondary nozzle at a velocity of the order of 100 mph to prevent the entry of any falling snow or rain into the switch, and
   (f) automatic control means associated with remotely controlled sensors to activate the apparatus at the onset of snow or freezing rain, whereby
   (g) in operation, the railroad switch is maintained operationally free of snow.

2. Apparatus according to claim 1, wherein two primary and two secondary nozzles are provided.

3. Apparatus according to claim 2 which includes at least one further elongate conduit, for receiving air from the air supply means, and for transporting air to a position between the secondary nozzles and a heel of the switch, and at least one tertiary nozzle extending from the said at least one further elongate conduit and having an open nozzle end for directing air along the rails, in the same direction as air from the primary and secondary nozzles, and towards the heel of the switch.

4. Apparatus according to claim 3, wherein the said at least one tertiary nozzle is bifurcated at the air outlet end to provide two, divergent air outlets.

5. Apparatus according to claim 2, wherein each primary nozzle is bifurcated at the air outlet end to provide two, divergent air outlets.

6. Apparatus according to claim 1 which includes at least one further elongate conduit for receiving air from the air supply means, and for transporting air to a position between the secondary nozzles and a heel of the switch, and at least one tertiary nozzle extending from the said at least one further elongate conduit and having an open nozzle end for directing air along the rails, in the same direction as air from the primary and secondary nozzles, and towards the heel of the switch.

7. Apparatus according to claim 6, wherein the said at least one tertiary nozzle is bifurcated at the air outlet end to provide two, divergent air outlets.

8. Apparatus according to claim 1, wherein each primary nozzle is bifurcated at the air outlet end to provide two, divergent air outlets.

9. A railroad switch snow deflecting air nozzle apparatus, comprising:
   (a) a first elongate conduit for transporting air under and transversely of stationary rails of the switch to a location ahead of switch points thereof, (b) a pair of primary nozzles extending from the first conduit and each having an open nozzle end for directing air along the rails and towards the switch points to a position adjacent the apex of the switch and in a direction from the apex towards the heel of the switch, (c) a second elongate conduit for transporting air under and transversely of the stationary rails to a location spaced from said primary nozzles and behind the switch points, (d) a pair of secondary nozzles extending from said second conduit and each having an open nozzle end for directing air along and between movable rails of the railway switch, and in the same direction as air from said primary nozzles, said pair of secondary nozzles being about one third the distance between the apex and the heel of the switch to effectively act in series with said pair of primary nozzles, (e) a third elongate conduit for transporting air under and transversely of the stationary rails to a location spaced from said secondary nozzles on the side farthest from said primary nozzles, (f) a pair of tertiary nozzles extending from said third conduit and each having an open nozzle end for directing air along and between movable rails of the railway switch, and in the same direction as air from said primary nozzles, said pair of tertiary nozzles being about two thirds the distance between the apex and the heel of the switch to effectively act in series with said pair of primary nozzles and said pair of secondary nozzles, (g) said first, second and third conduits being of rectangular cross-section and said nozzles being bifurcated and of rectangular cross-section, each nozzle protruding from the top surface of the respective conduit, the nozzles being at least partially supported by the railroad ties with the nozzles located below the top level of the rails, (h) said first, second and third conduits being connected together by a conduit of substantially circular cross-section, (i) air supply means, having a snow protected air inlet, for supplying air at ambient temperatures to the first, second and third conduits for air to exit from said primary nozzles at a velocity of the order of 100 mph and from said secondary and tertiary nozzles at a velocity of the order of 100 mph to prevent the entry of any falling snow or rain into the switch, (j) one of said rectangular conduits being continued and being connected to the outlet of said air supply means, (k) automatic control means associated with remotely located sensors to activate the apparatus at the onset of snow or freezing rain, whereby, (l) in operation, the railroad switch is maintained operationally free of snow.

* * * * *